United States Patent
Yamada

[11] Patent Number: 5,812,326
[45] Date of Patent: Sep. 22, 1998

[54] WIDE ANGLE LENS

[75] Inventor: Hiroshi Yamada, Omiya, Japan

[73] Assignee: Fuji Photo Optical Co., Ltd., Omiya, Japan

[21] Appl. No.: 614,896

[22] Filed: Mar. 13, 1996

[30] Foreign Application Priority Data

May 24, 1995 [JP] Japan ..................................... 7-151088

[51] Int. Cl.$^6$ .............................. G02B 9/00; G02B 13/22
[52] U.S. Cl. ........................ 359/749; 359/651; 359/742; 359/748; 359/750; 359/751; 359/752; 359/753; 359/663; 359/679
[58] Field of Search .................................... 359/651, 742, 359/749–753, 663, 679

[56] References Cited

U.S. PATENT DOCUMENTS 4,936,657  6/1990  Tejima et al. ............................ 359/742
5,390,048  2/1995  Miyatake et al. ........................ 359/651

OTHER PUBLICATIONS

Nikkei Sangyo Shimbun, Abstract, Oct. 18, 1994.

Primary Examiner—David C. Nelms
Assistant Examiner—Evelyn A. Lester
Attorney, Agent, or Firm—Ronald R. Snider

[57] ABSTRACT

A wide angle lens is made of three groups so as to satisfy a predetermined conditional expression concerning abbe number, thereby making it telecentric and yielding no eclipse in its peripheral luminous flux. Also, an apparatus accommodating it is made compact as a whole. This wide angle lens comprises, arranged in the following order from the screen side toward the liquid crystal side, a first lens group composed of a concave lens (L1), whose concave surface having a large radius of curvature is directed toward a smaller conjugate side (liquid crystal panel), and a convex lens (L2); a second lens group composed of one concave lens (L3) and two convex lenses (L4) and (L5); and a third lens group composed of a Fresnel lens (L6) which is disposed near a liquid crystal panel (L7; 4). The abbe number ν 1 of the lens L1 which is the concave lens in the first lens group is 57.8, whereas the abbe number ν 2 of the lens (L3) which is the concave lens in the second lens group is 25.4, thereby satisfying the conditional expression of ν 1>ν 2. The focal length f1 of the first lens group is 453.1 mm, whereas the focal length f0 of the whole lens group system is 67.76 mm, thereby satisfying |f1|>f0.

2 Claims, 22 Drawing Sheets

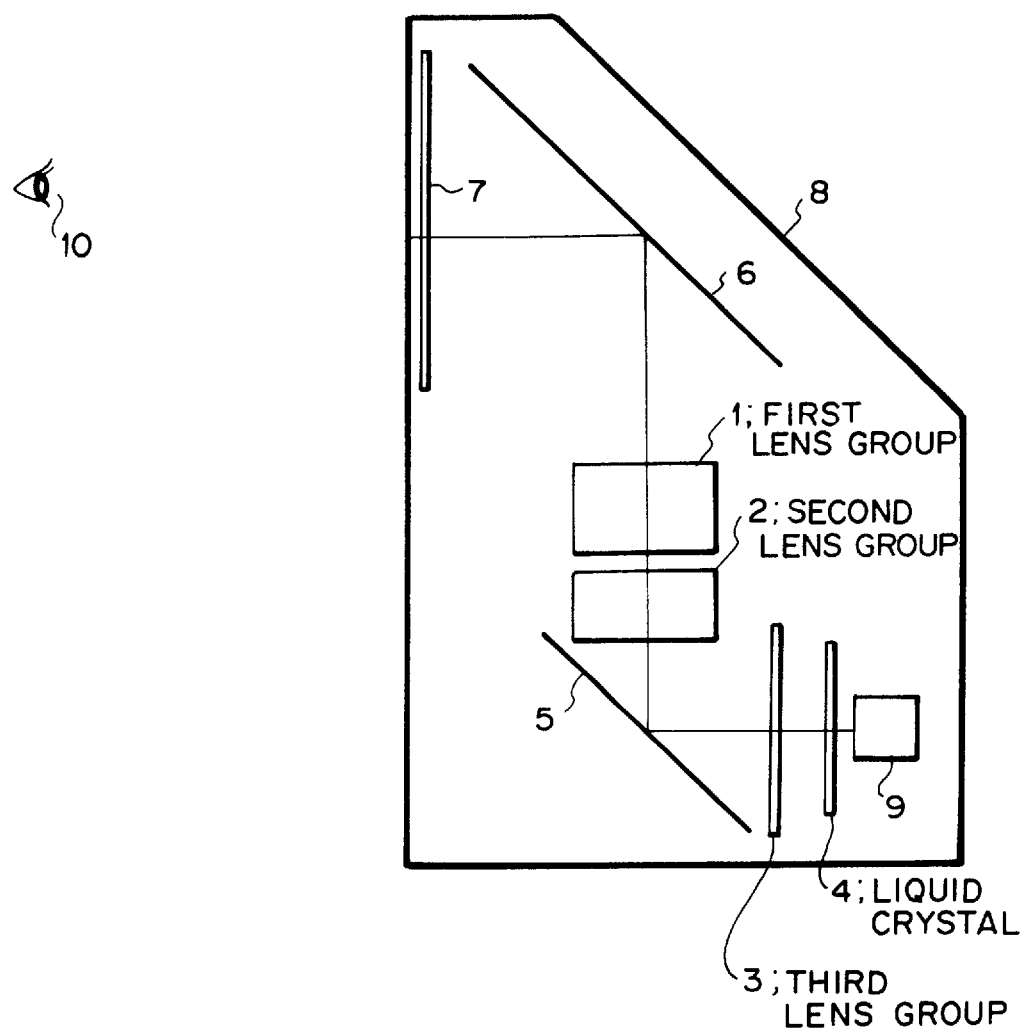

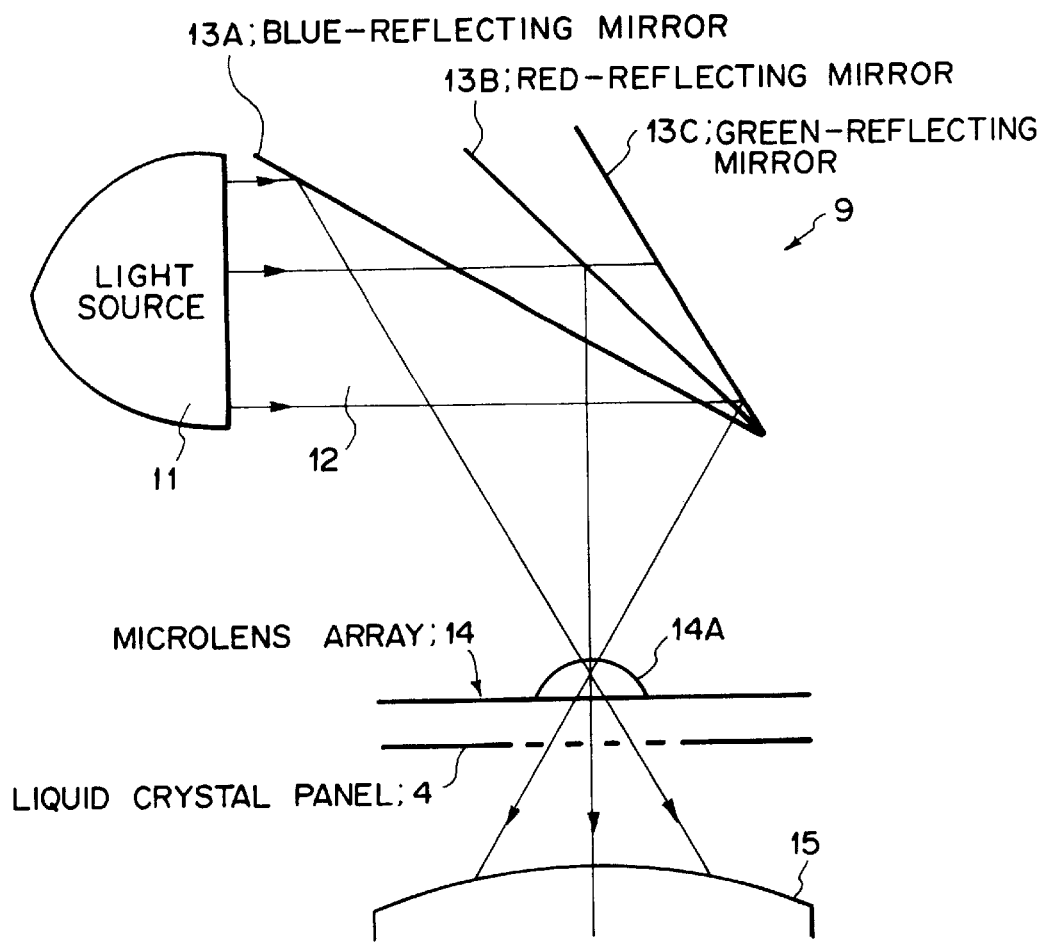

WIDE ANGLE LENS

RELATED APPLICATIONS

This application claims the priority of Japanese Patent Application No. 7-151088 filed on May 24, 1995, which is incorporated herein by reference.

BACKGROUND OF THE INVENTION

1. Field of the Invention

The present invention relates to a wide angle lens used for projection and, more specifically, to a projection lens such as that used in color liquid crystal projection television.

2. Description of the Prior Art

In recent years, liquid crystal projection television, in which a projection lens is used to project an image displayed on a liquid crystal panel onto a large screen, has widely been used in such places as theater, exhibition hall, and airplane.

As a color liquid crystal projector, a single-plate type using a single liquid crystal panel and a three-plate type using three panels have been known. While the former attracts attention due to its smaller weight and lower cost as compared with the latter, it has a shortcoming that screen illuminance is lowered due to its use of a color filter for color separation.

Accordingly, in recent years, attempts have been made to develop a liquid crystal video projector which can reproduce a full-color image without using a color filter (e.g., a liquid crystal video projector reported in Nikkei Sangyo Shimbun dated Oct. 18, 1994).

As an optical system for a liquid video projector, a configuration such as that shown in FIG. 6 has been known. Namely, in this optical system 9, light 12 emitted from a light source 11 is separated by three dichroic mirrors 13A, 13B, and 13B, which are disposed such that the light 12 is incident thereon with incident angles different from each other, into three primary color light components of blue, red, and green. These primary color light components are then converged by a microlens array 14 upon respective pixels of a liquid crystal panel 4. The respective primary color light components passing through this liquid crystal panel 4 with image information data carried thereon are projected by a projection lens 15 onto a non-depicted screen.

Here, in the configuration shown in FIG. 6, since the primary color light components reflected by the three dichroic mirrors 13A, 13B, and 13C enter the liquid crystal panel 4 with angles different from each other, in order to make their light quantities efficiently enter a stop disposed within the projection lens 15, it is important for the projection lens 15 to be configured such that it is telecentric and that no eclipse occurs in its peripheral luminous flux.

However, in the projection lens 15 in the prior art such as that mentioned above, while a telecentric condition is substantially satisfied, no attention has been paid to eclipse of its peripheral luminous flux. Accordingly, color may become uneven in the left and right portions of the projected image on the screen. As mentioned above, in the liquid crystal video projector having a configuration such as that shown in FIG. 6, in which the respective primary color light components enter the projection lens 15 with certain extent among them thereby yielding a large proportion of peripheral light quantity, it is particularly necessary for the projection lens to be formed such that the eclipse of this peripheral luminous flux is minimized.

SUMMARY OF THE INVENTION

In view of these circumstances, an object of the present invention is to provide a projection lens which is telecentric and yields no eclipse in its peripheral luminous flux and by which an apparatus accommodating it can be made compact as a whole.

An additional object of the present invention is to provide a projection lens in which, even when the magnification of projection varies, the deterioration of image quality with respect to the peripheral luminous flux is small.

The wide angle lens in accordance with the present invention comprises, in the following order from a larger conjugate side, a first lens group composed of a concave lens, whose concave surface having a large radius of curvature is directed toward a smaller conjugate side, and a convex lens; a second lens group composed of at least one concave lens and at least two convex lenses; and a third lens group composed of a Fresnel lens which is disposed near an object to be projected and has a positive power. The first and second lens groups each have at least one lens having an aspherical surface. Assuming that the abbe number of the concave lens of the first lens group is v 1 and the abbe number of the concave lens of the second lens group is v 2, the following conditional expression is satisfied:

$$\nu 1 > \nu 2 \qquad (1)$$

Also, in cases where the conjugate length is changed so as to alter the magnification of projection, when the Fresnel lens of the third lens group is fixed, while the first and second lens groups are moved with variable distance therebetween, assuming that the focal length of the first lens group is f1 and the focal length of the whole lens system is f0, the following conditional expression is satisfied:

$$|f1| > f0 \qquad (2)$$

The objects of the present invention are achieved by the wide angle lens configured as mentioned above. In the following, the operation of each lens group will be explained.

In the first lens group, the concave lens having a strong concave surface directed toward the projection object is disposed so as to yield a retro-focus type characteristic. Accordingly, the second lens group and the third lens group can be distanced from each other such that a space for inserting a mirror can be secured therebetween. As a result, the optical path can be bent, whereby the apparatus as a whole can be made compact. Also, when the projection angle is wide, its strain aberration can be corrected easily. Further, the angle of the peripheral luminous flux passing through the lens disposed between the concave lens and the liquid crystal panel can be made obtuse, whereby various kinds of aberration can be corrected easily. The convex lens in this first lens group is necessary for attaining a balanced power in combination with the above-mentioned concave lens and for satisfying the above conditional expression (2). Preferably, the v value of the convex lens is made smaller than that of the concave lens, since magnification chromatic aberration can be easily corrected thereby.

In the second lens group, as the concave lens satisfying the above conditional expression (1) is disposed, magnification chromatic aberration as well as axial chromatic aberration can be corrected. Unless this condition is satisfied, additional lenses for correcting chromatic aberration will be necessary in the first and second lens groups, thereby increasing the number of lenses. Also, the convex lens in the second lens group acts to secure the focal length of the whole system. Preferably, the second lens group includes two or more such convex lenses since a single lens may have such a strong power that various kinds of aberration cannot be easily corrected.

Also, when at least one lens surface in each of the first and second lens groups is made aspherical, coma can be corrected in particular. As mentioned above, in the liquid crystal video projector having a configuration such as that shown in FIG. 6, since the peripheral luminous flux becomes greater, it is quite important for coma to be corrected.

In the third lens group, a convex-power Fresnel lens acting as a field lens is disposed near the liquid crystal panel, thereby realizing a telecentric projection lens system. As the Fresnel lens is used, the under-focus tendency of the image surface obtained when a general convex lens is used as the field lens can be eliminated, whereby the image surface can be easily corrected. Also, as the Fresnel lens is made aspherical, strain and image surface distortion can be easily corrected.

Further, in cases where the magnification of projection is changed, when the Fresnel lens of the third lens group is fixed, while the first and second lens groups are moved with variable distance therebetween so as to effect focusing, the peripheral image surface can be easily corrected. Also, in this case, when the above conditional expression (2) is satisfied, fluctuation in spherical aberration can be made smaller, thereby preventing the image quality near the center portion from deteriorating.

BRIEF DESCRIPTION OF THE DRAWINGS

FIG. 5 is a schematic view showing a liquid crystal video projector using a wide angle lens in accordance with an embodiment of the present invention;

FIG. 6 is a schematic view showing a color separation optical system used in the projector shown in FIG. 5;

DETAILED DESCRIPTION OF THE PREFERRED EMBODIMENTS

Figure 1:
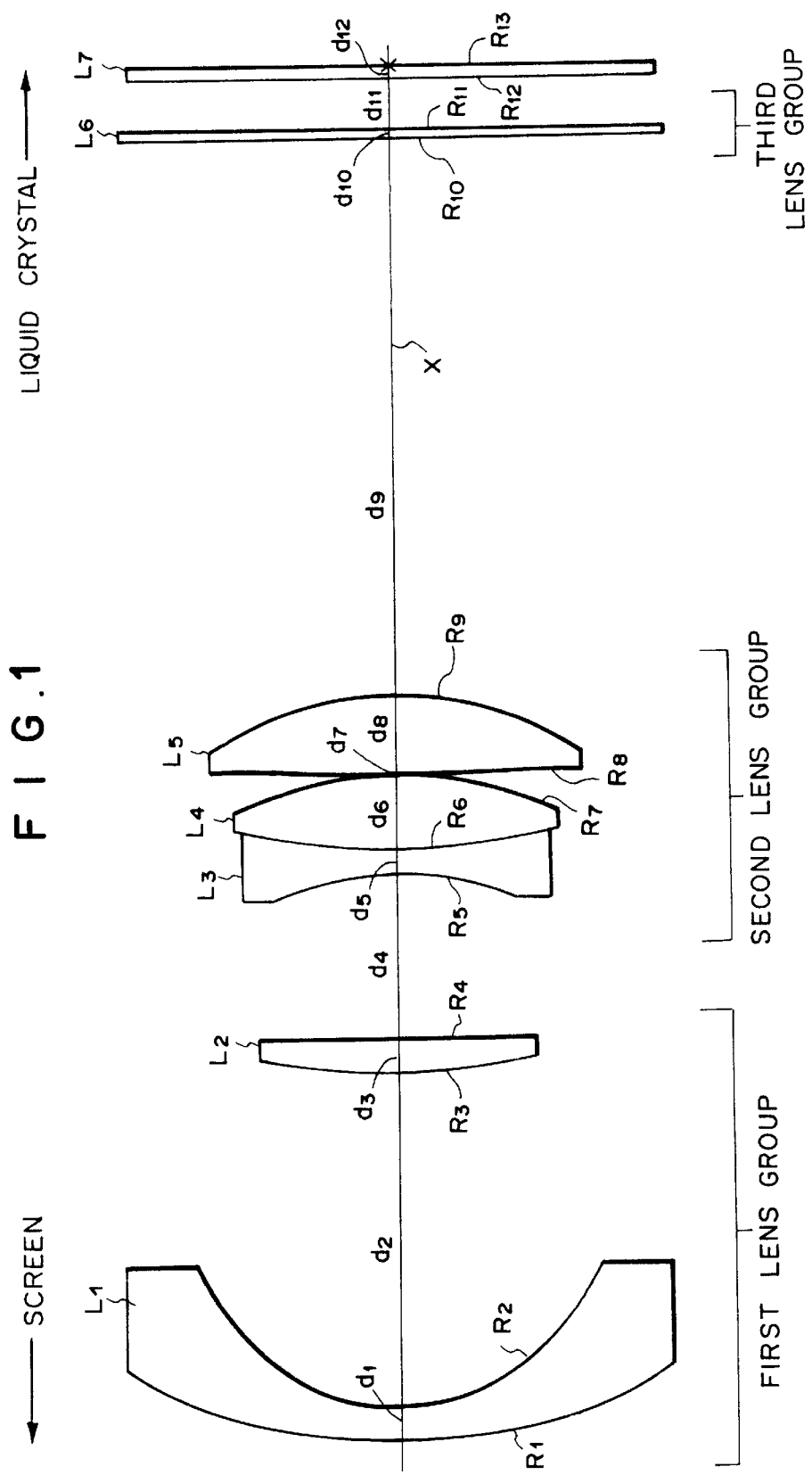
FIG. 1 is a cross-sectional view showing a wide angle lens in accordance with the first embodiment of the present invention.

In the following, embodiments of the present invention will be explained.

FIG. 5 is a schematic view of a liquid crystal video projector using a wide angle lens in accordance with an embodiment of the present invention.

Namely, in this liquid crystal video projector 8, each dot of a liquid crystal panel 4 is irradiated with light by a color separation optical system 9, such as that shown in FIG. 6, comprising a light source 11, three dichroic mirrors 13A, 13B, and 13C, a lens array 14 in which numerous lens elements 14A are arranged. The light carrying the image information displayed on the liquid crystal panel 4 is projected onto a rear surface of a screen 7 by a projection lens comprising three lens groups 1, 2, and 3. From the front side of the screen 7, a viewer 10 sees the image projected thereon. In order to make the whole apparatus compact, two reflective mirrors 5 and 6 are used to bend the optical path. One of the reflective mirrors 5 is disposed between the second lens group 2 and third lens group 3 of the projection lens.

In the following, the above-mentioned projection lens will be explained in detail.

FIG. 1 is a cross-sectional view of a lens system showing the wide angle lens in accordance with the first embodiment of the present invention.

Namely, this lens system comprises, arranged in the following order from the screen side toward the liquid crystal side, the first lens group 1 composed of a concave lens L1, whose concave surface having a large radius of curvature is directed toward a smaller conjugate side (liquid crystal panel), and a convex lens L2; the second lens group 2 composed of one concave lens L3 and two convex lenses L4 and L5; and the third lens group 3 composed of a Fresnel lens L6 which is disposed near a liquid crystal panel L7 (4).

In this drawing (as well as in FIGS. 2, 3, and 4), X indicates the optical axis.

Here, the lenses L1 and L5 are made of plastic lenses and configured such that their focal movement is minimized with respect to change in temperature.

The following Table 1 shows radius of curvature R (mm) of each lens surface near the optical axis X, central thickness of each lens or air space between neighboring lenses d (mm), refractive index N of each lens with respect to d-rays, and abbe number ν of each lens in this embodiment.

The numbers attached to the marks R, d, N, and ν in Table 1 are in numerical order from the screen side.

Here, the distance d4 between the first and second lens groups and the distance d9 between the second and third lens groups are variable. At a low magnification (×10), d4 and d9 are 31.37 mm and 107.85 mm, respectively. At a high magnification (×16), d4 and d9 are 32.47 mm and 105.06 mm, respectively.

The abbe number ν 1 of the lens L1 which is the concave lens in the first lens group is 57.8, whereas the abbe number ν 2 of the lens L3 which is the concave lens in the second lens group is 25.4, thereby satisfying the conditional expression of:

$$\nu 1 > \nu 2$$

Also, the focal length f1 of the first lens group is 453.1 mm, whereas the focal length f0 of the whole lens group system is 67.76 mm, thereby satisfying:

|f1|>f0

Further, both sides of the lenses L1 and L5 as well as the surface of the Fresnel lens L6 facing the liquid crystal panel are aspherical. Their forms are represented when values of C, K, a2, a4, a6, a8, and a10 shown in the following Table 2 are input into their corresponding coefficients in the following aspherical expression:

$$X = \frac{CY^2}{1 + 1 - KCY^2} + \sum_{i=1}^{N} a_i Y^{2i} \quad \text{[Expression 1]}$$

$$C; \frac{1}{R}$$

In the above aspherical expression, X is the distance from the lens in the direction of the optical axis X, while Y is a distance from the optical axis X in the direction perpendicular to the optical axis X. Also, C represents curvature.

In the lens data listed in Table 1, the last two-surface distance d12 is the sum of thickness values of the glass substrate and polarizing filter in the liquid crystal panel.

Figure 2:
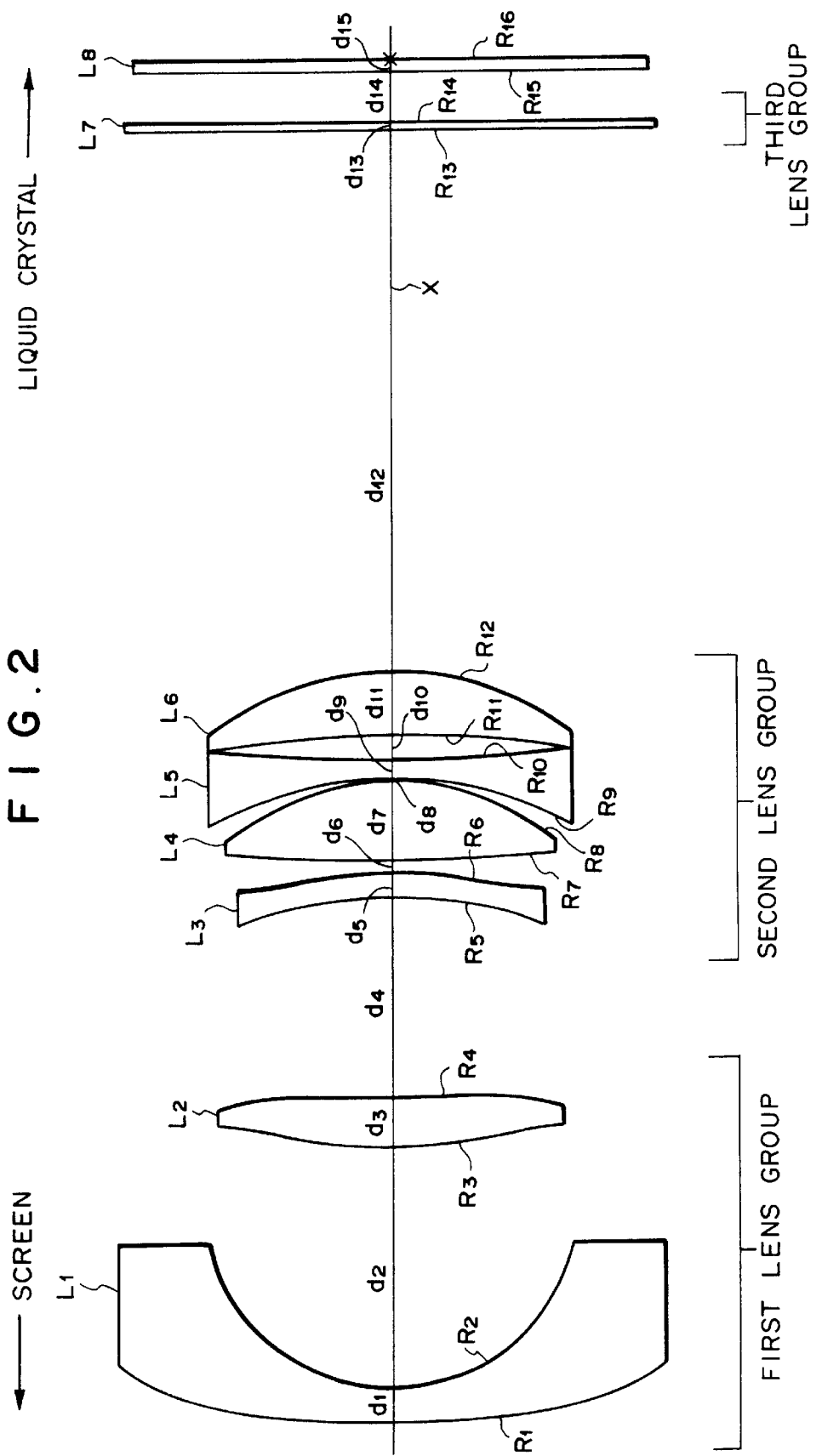
FIG. 2 is a cross-sectional view showing a wide angle lens in accordance with the second embodiment of the present invention.

FIG. 2 is a cross-sectional view of a lens system showing the wide angle lens in accordance with the second embodiment of the present invention.

Namely, this lens system comprises, arranged in the following order from the screen side toward the liquid crystal side, a first lens group composed of a concave lens L1, whose concave surface having a large radius of curvature is directed toward a smaller conjugate side (liquid crystal panel), and a convex lens L2; a second lens group composed of one concave lens L5 and three convex lenses L3, L4, and L6; and a third lens group composed of a Fresnel lens L7 which is disposed near a liquid crystal panel L8.

Here, the lenses L1, L2, and L3 are made of plastic lenses and configured such that their focal movement is minimized with respect to change in temperature.

The following Table 3 shows radius of curvature R (mm) of each lens surface near the optical axis X, central thickness of each lens or air space between neighboring lenses d (mm), refractive index N of each lens with respect to d-rays, and abbe number ν of each lens in this embodiment.

The numbers attached to the marks R, d, N, and ν in Table 3 are in numerical order from the screen side.

Here, the distance d4 between the first and second lens groups and the distance d12 between the second and third lens groups are variable. At a low magnification (×10), d4 and d12 are 39.41 mm and 107.3 mm, respectively. At a high magnification (×16), d4 and d9 are 40.72 mm and 105.28 mm, respectively.

The abbe number ν 1 of the lens L1 which is the concave lens in the first lens group is 57.8, whereas the abbe number ν 2 of the lens L5 which is the concave lens in the second lens group is 23.9, thereby satisfying the conditional expression of:

ν 1>ν 2

Also, the focal length f1 of the first lens group is −389.92 mm, whereas the focal length f0 of the whole lens group system is 66.87 mm, thereby satisfying:

|f1|>f0

Further, both sides of the lenses L1, L2, and L3 as well as the surface of the Fresnel lens L7 facing the liquid crystal panel are aspherical. Their forms are represented when values of C, K, a2, a4, a6, a8, and a10 shown in the following Table 4 are input into their corresponding coefficients in the above-mentioned aspherical expression.

In the lens data listed in Table 3, the last two-surface distance d15 is the sum of thickness values of the glass substrate and polarizing filter in the liquid crystal panel.

Figure 3:
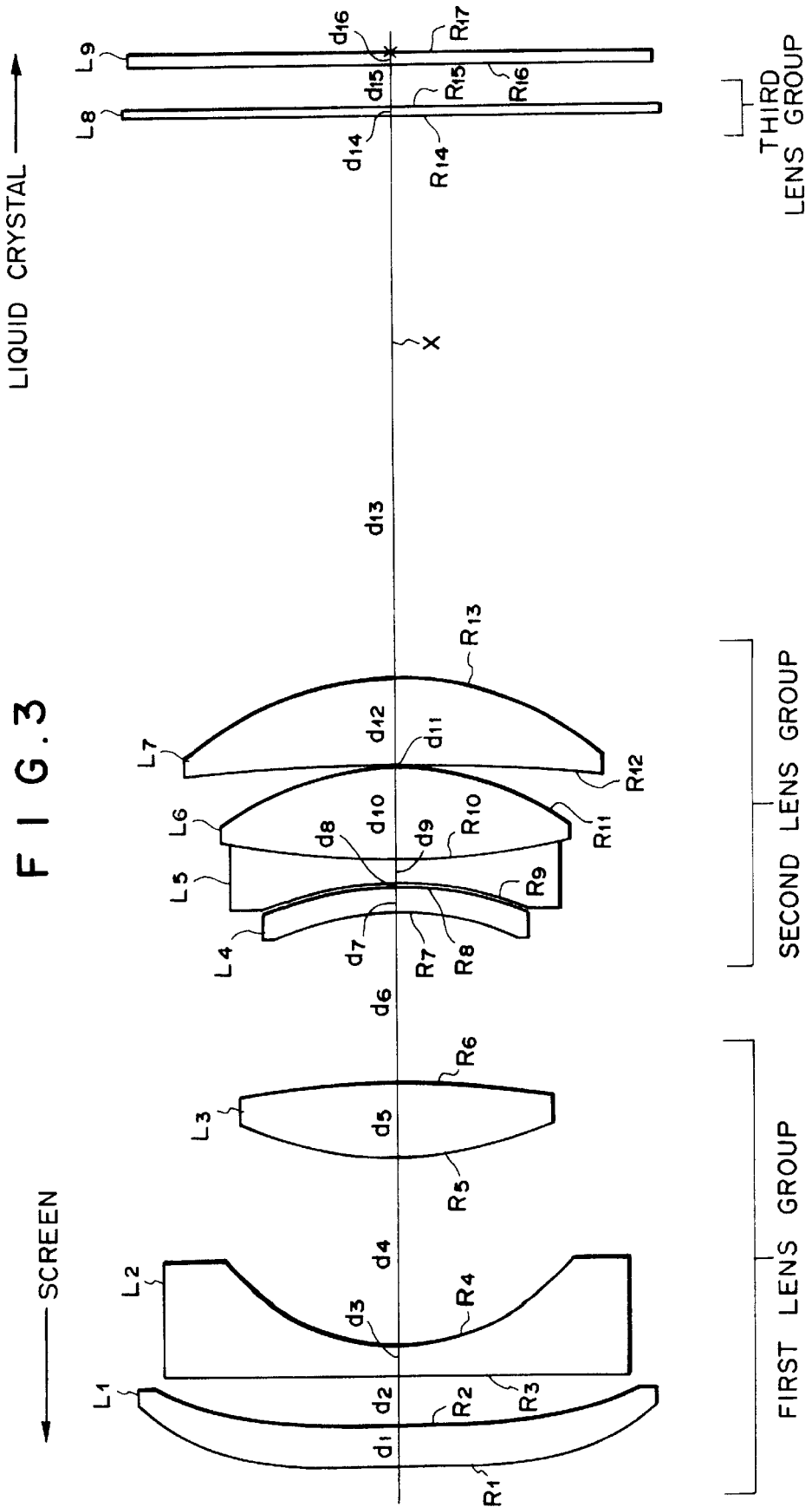
FIG. 3 is a cross-sectional view showing a wide angle lens in accordance with the third embodiment of the present invention.

FIG. 3 is a cross-sectional view of a lens system showing the wide angle lens in accordance with the third embodiment of the present invention.

Namely, this lens system comprises, arranged in the following order from the screen side toward the liquid crystal side, a first lens group composed of a meniscus concave lens L1 having a weak power, a concave lens L2, whose concave surface having a large radius of curvature is directed toward a smaller conjugate side (liquid crystal panel), and a convex lens L3; a second lens group composed of one concave lens L5 and three convex lenses L4, L6, and L7; and a third lens group composed of a Fresnel lens L8 which is disposed near a liquid crystal panel L9.

In this lens system, the lenses having main powers are made of glass lens, while powers of plastic lenses are made weak, such that the focal movement is minimized with respect to change in temperature.

The following Table 5 shows radius of curvature R (mm) of each lens surface near the optical axis X, central thickness of each lens or air space between neighboring lenses d (mm), refractive index N of each lens with respect to d-rays, and abbe number ν of each lens in this embodiment.

The numbers attached to the marks R, d, N, and ν in Table 5 are in numerical order from the screen side.

Here, the distance d6 between the first and second lens groups and the distance d13 between the second and third lens groups are variable. At a low magnification (×10), d6 and d13 are 32.56 mm and 109.78 mm, respectively. At a high magnification (×16), d6 and d13 are 34.02 mm and 107.92 mm, respectively.

The abbe number ν 1 of the lens L2 which is the concave lens in the first lens group is 50.9, whereas the abbe number ν 2 of the lens L5 which is the concave lens in the second lens group is 25.5, thereby satisfying the conditional expression of:

ν 1>ν 2

Also, the focal length f1 of the first lens group is 282.37 mm, whereas the focal length f0 of the whole lens group system is 66.85 mm, thereby satisfying:

|f1|>f0

Further, both sides of the lenses L1 and L4 as well as the surface of the Fresnel lens L8 facing the liquid crystal panel are aspherical. Their forms are represented when values of C, K, a2, a4, a6, a8, and a10 shown in the following Table 6 are input into their corresponding coefficients in the above-mentioned aspherical expression.

In the lens data listed in Table 5, the last two-surface distance d16 is the sum of thickness values of the glass substrate and polarizing filter in the liquid crystal panel.

Figure 4:
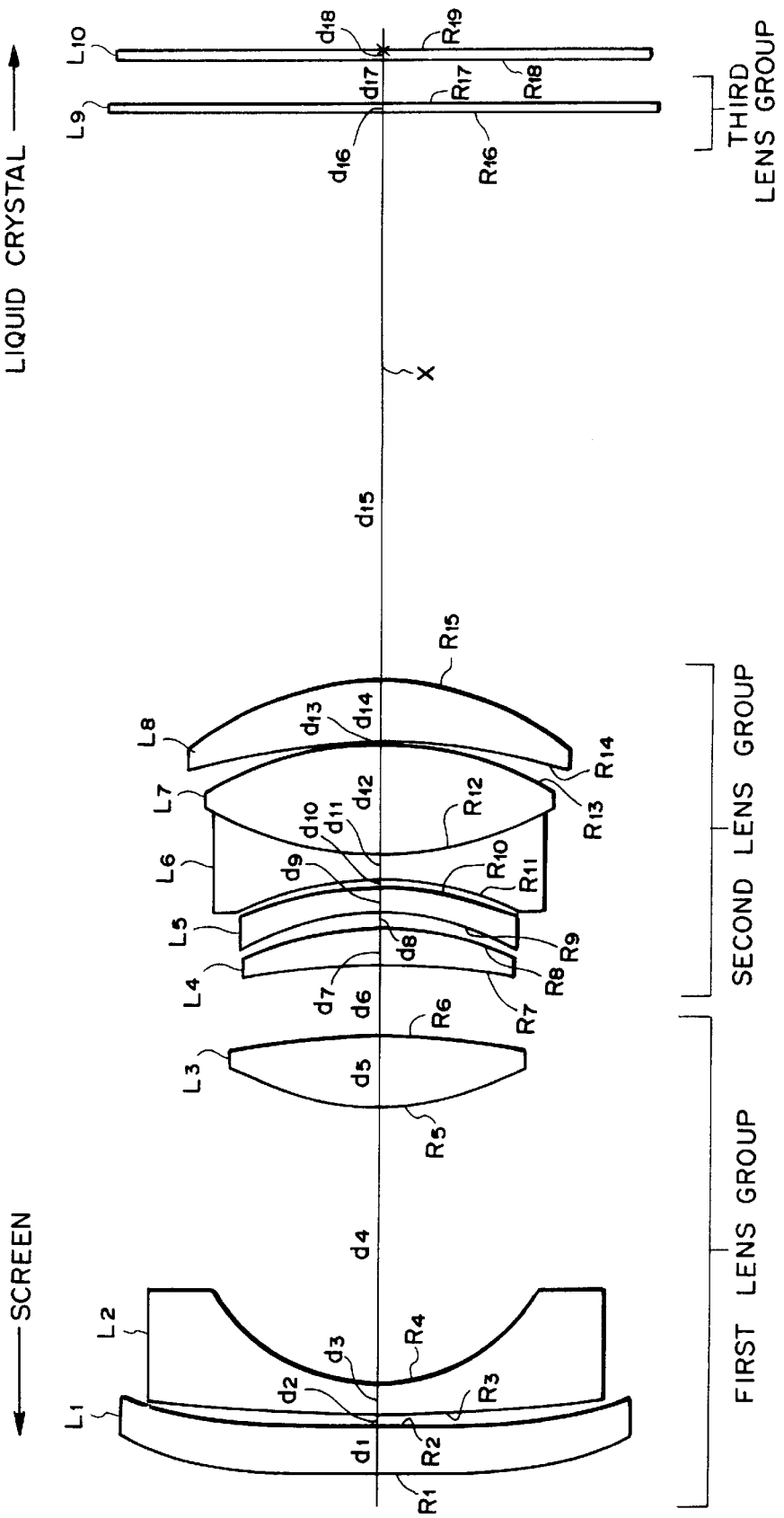
FIG. 4 is a cross-sectional view showing a wide angle lens in accordance with the fourth embodiment of the present invention.
Figure 7A:
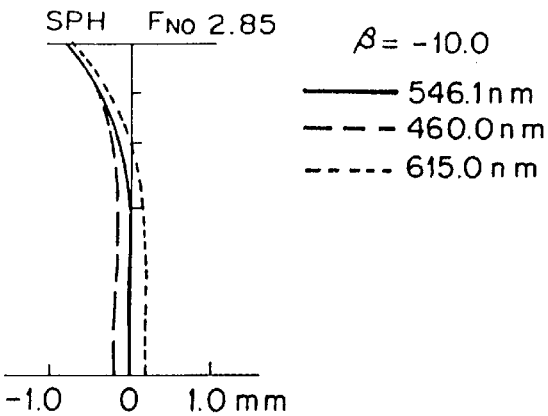
FIG. 7 is an aberration chart (at a low magnification) of the wide angle lens in accordance with the first embodiment of the present invention.
Figure 7B:
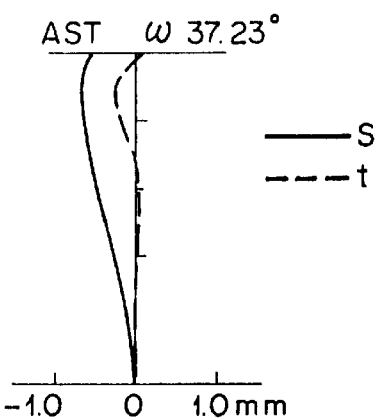
Figure 7C:
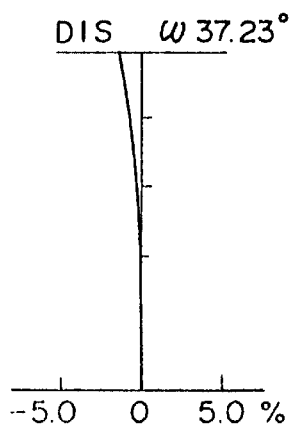
Figure 7D:
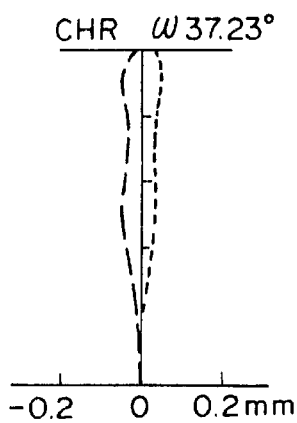
Figure 7E:
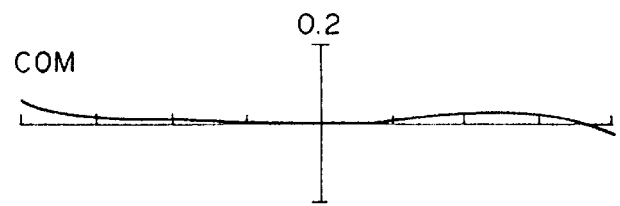
Figure 7F:
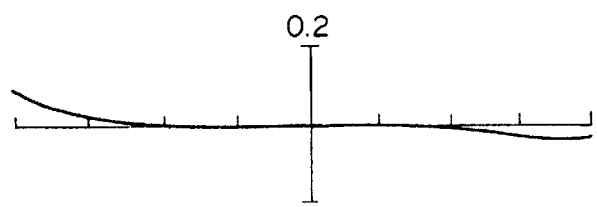
Figure 7G:
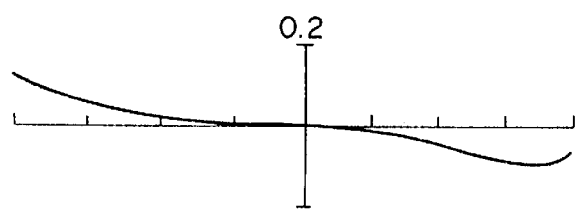
Figure 7H:
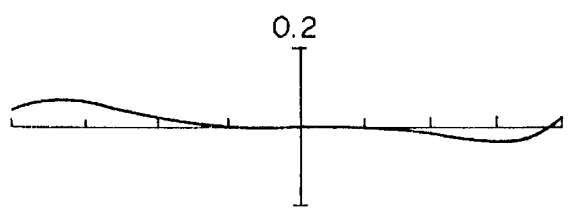
Figure 8A:
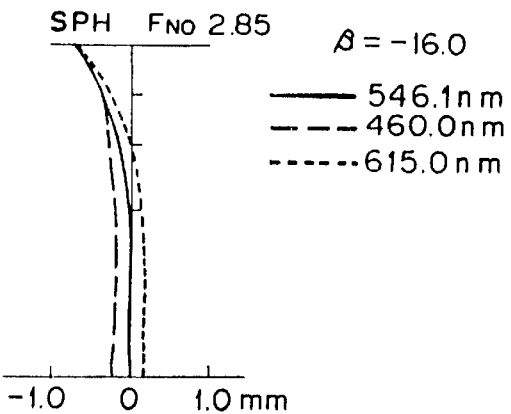
FIG. 8 is an aberration chart (at a high magnification) of the wide angle lens in accordance with the first embodiment of the present invention.
Figure 8B:
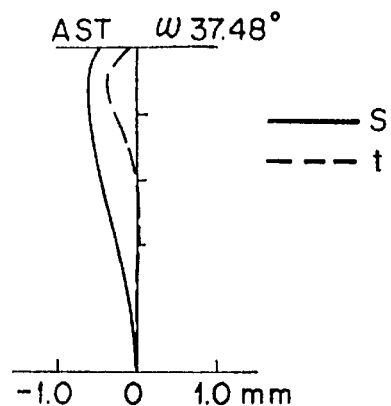
Figure 8C:
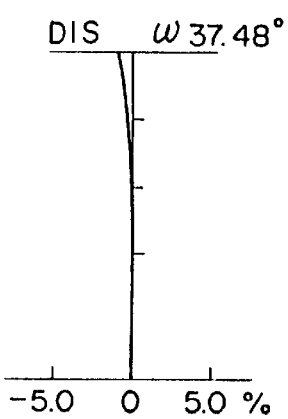
Figure 8D:
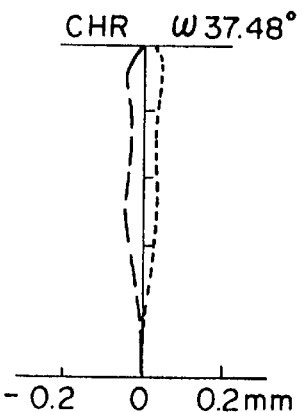
Figure 8E:
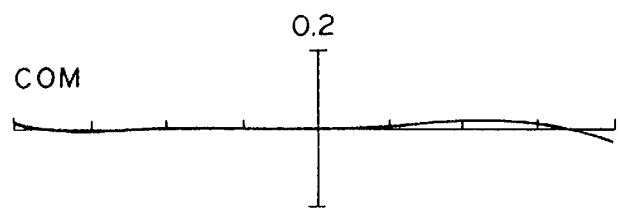
Figure 8F:
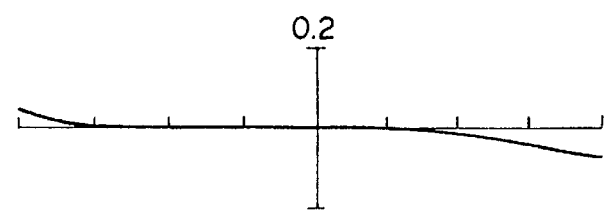
Figure 8G:
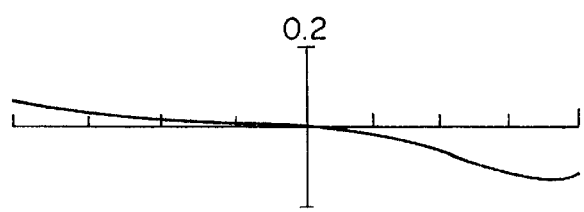
Figure 8H:
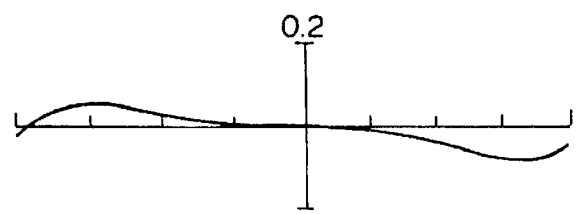
Figure 9A:
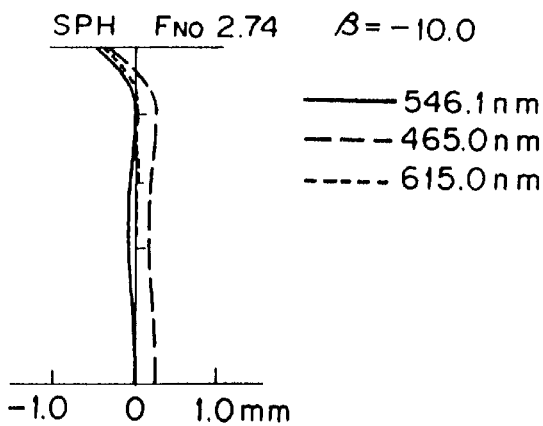
FIG. 9 is an aberration chart (at a low magnification) of the wide angle lens in accordance with the second embodiment of the present invention.
Figure 9B:
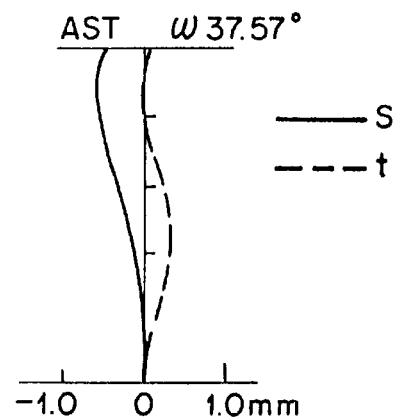
Figure 9C:
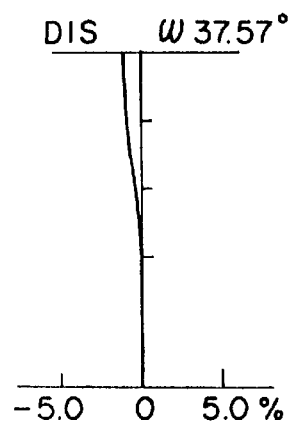
Figure 9D:
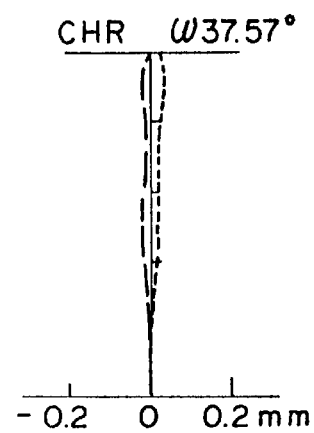
Figure 9E:
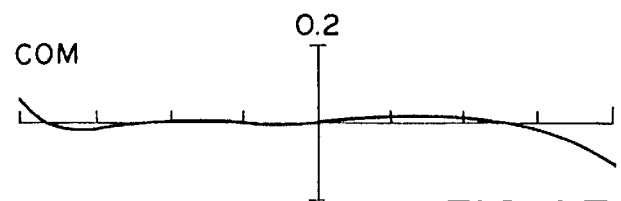
Figure 9F:
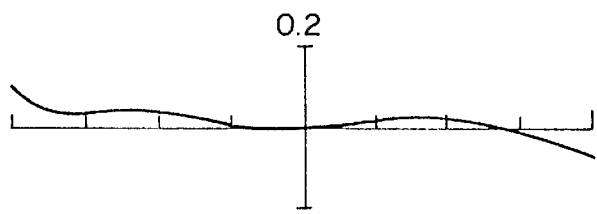
Figure 9G:
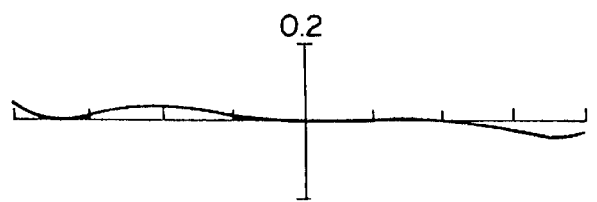
Figure 9H:
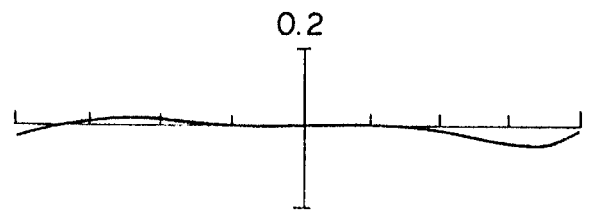
Figure 10A:
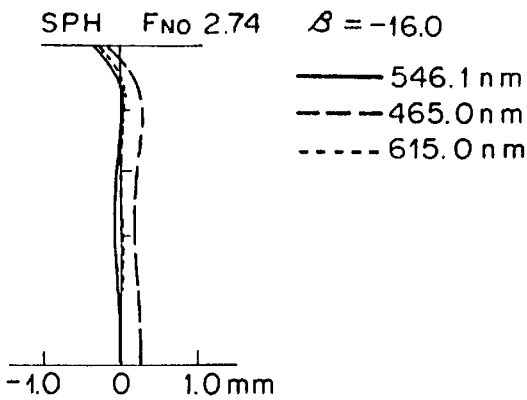
FIG. 10 is an aberration chart (at a high magnification) of the wide angle lens in accordance with the second embodiment of the present invention.
Figure 10B:
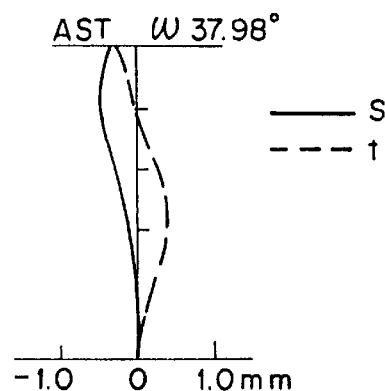
Figure 10C:
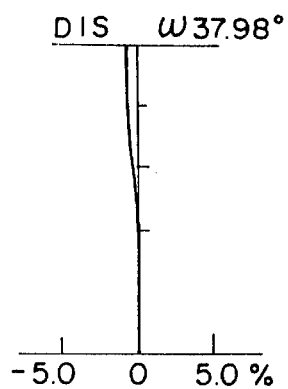
Figure 10D:
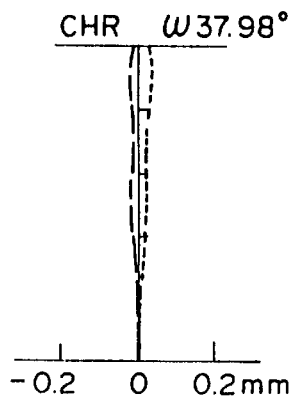
Figure 10E:
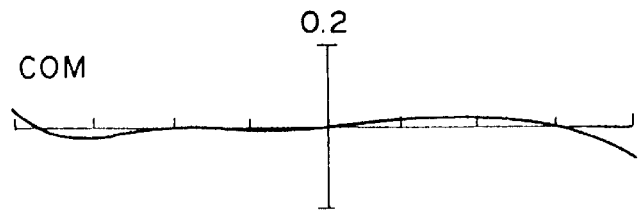
Figure 10F:
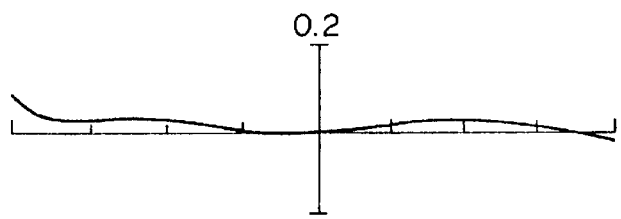
Figure 10G:
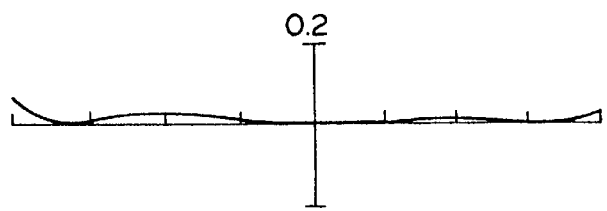
Figure 10H:
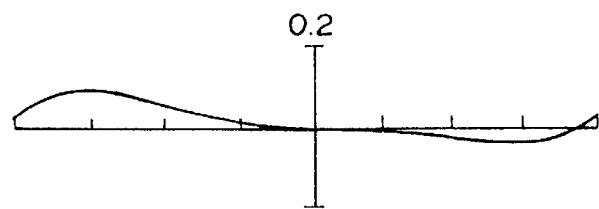
Figure 11A:
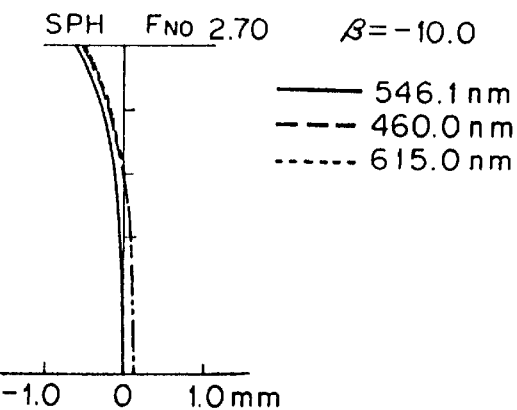
FIG. 11 is an aberration chart (at a low magnification) of the wide angle lens in accordance with the third embodiment of the present invention.
Figure 11B:
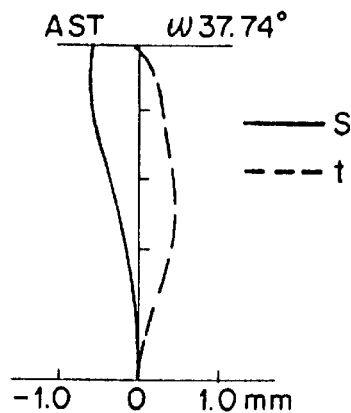
Figure 11C:
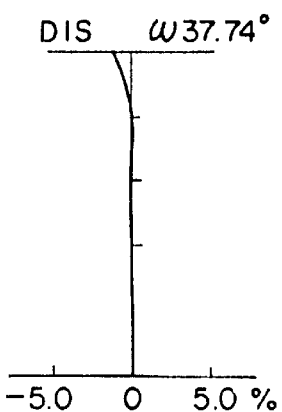
Figure 11D:
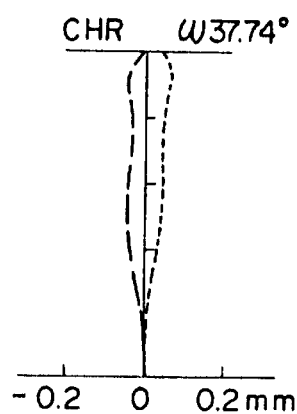
Figure 11E:
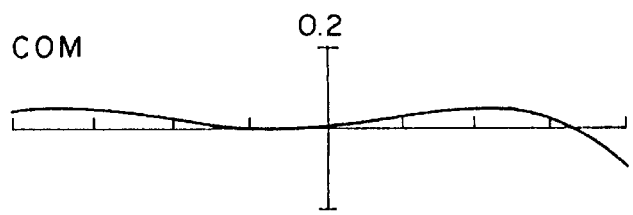
Figure 11F:
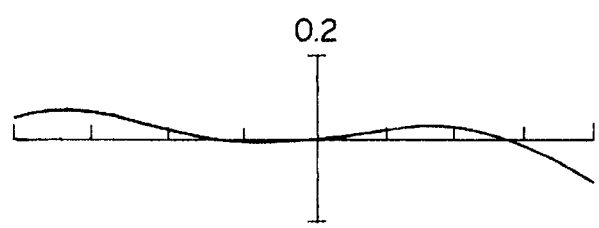
Figure 11G:
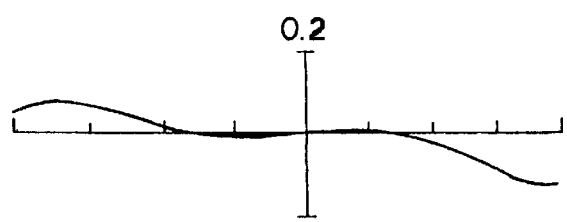
Figure 11H:
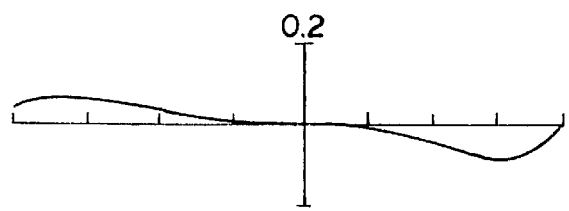
Figure 12A:
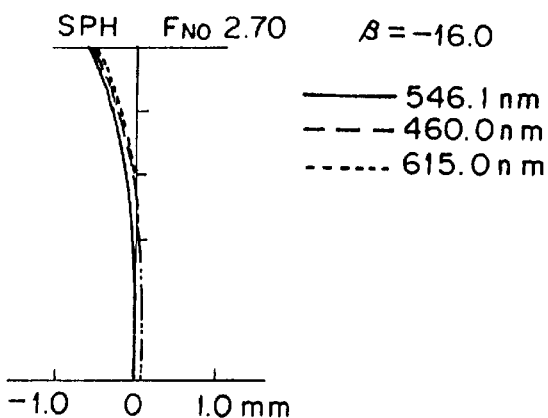
FIG. 12 is an aberration chart (at a high magnification) of the wide angle lens in accordance with the third embodiment of the present invention.
Figure 12B:
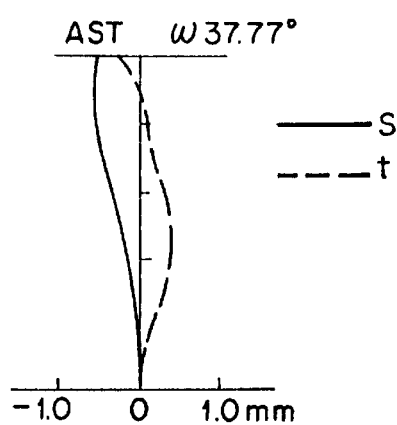
Figure 12C:
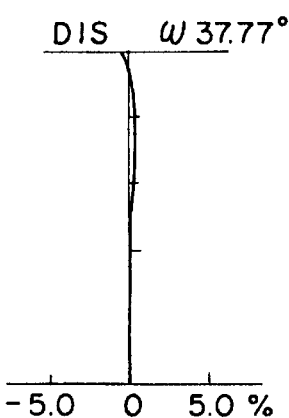
Figure 12D:
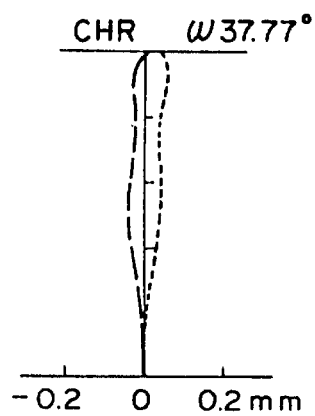
Figure 12E:
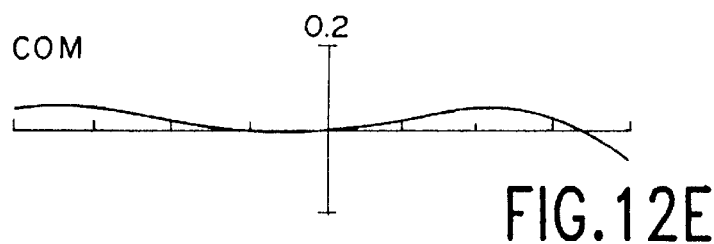
Figure 12F:
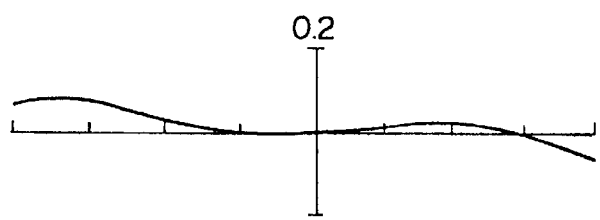
Figure 12G:
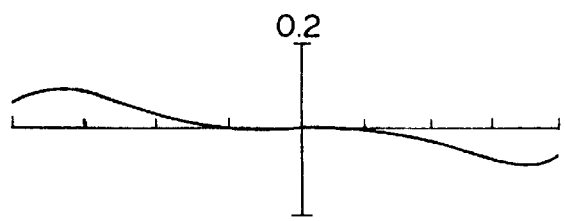
Figure 12H:
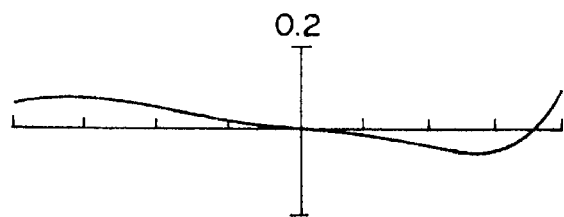
Figure 13A:
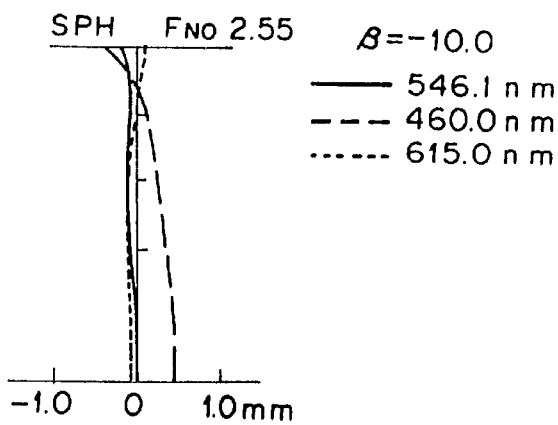
FIG. 13 is an aberration chart (at a low magnification) of the wide angle lens in accordance with the fourth embodiment of the present invention.
Figure 13B:
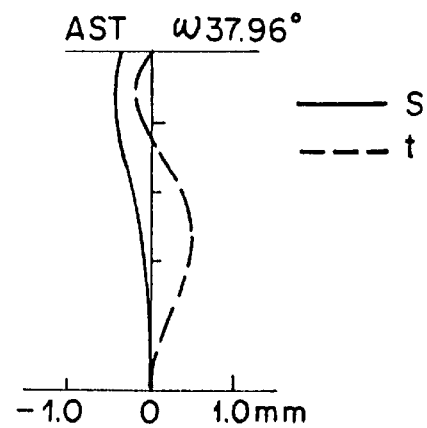
Figure 13C:
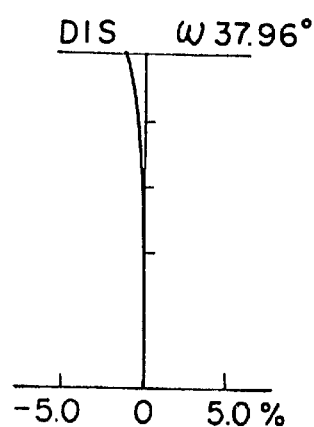
Figure 13D:
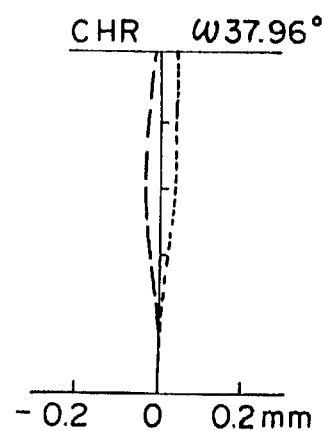
Figure 13E:
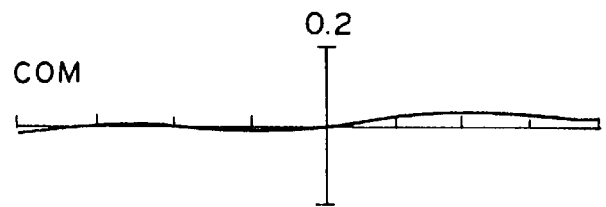
Figure 13F:
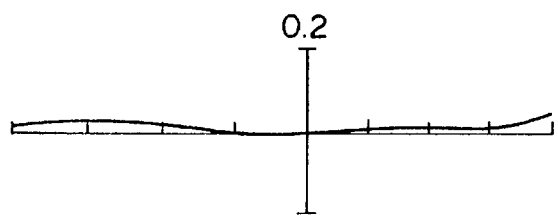
Figure 13G:
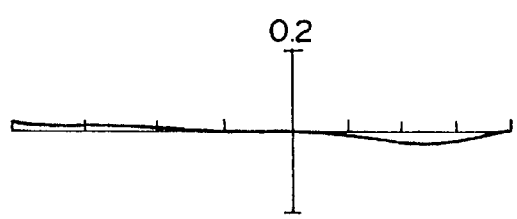
Figure 13H:
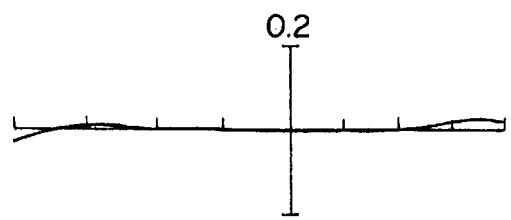
Figure 14A:
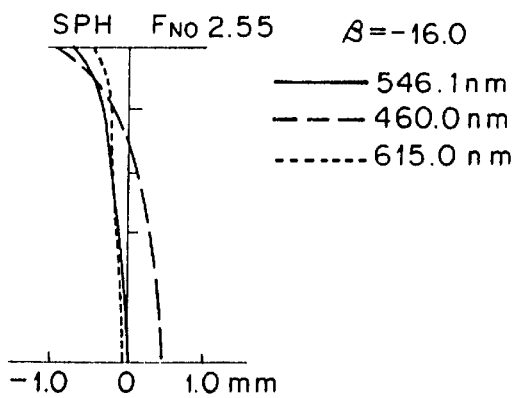
FIG. 14 is an aberration chart (at a high magnification) of the wide angle lens in accordance with the fourth embodiment of the present invention.
Figure 14B:
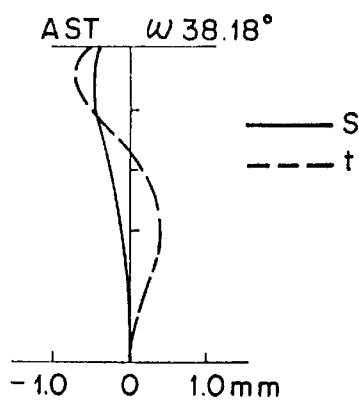
Figure 14C:
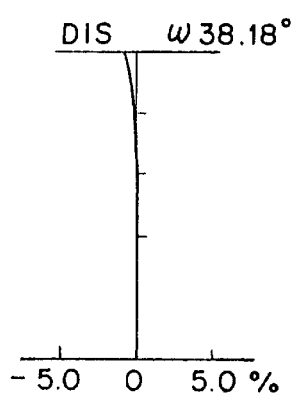
Figure 14D:
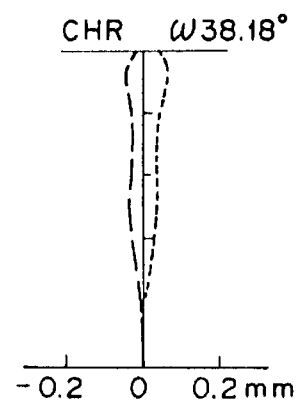
Figure 14E:
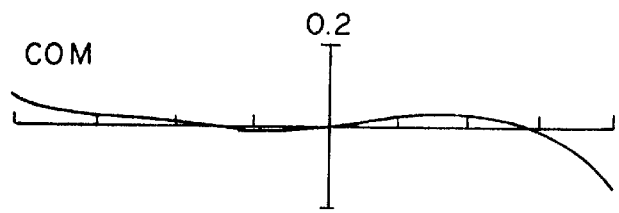
Figure 14F:
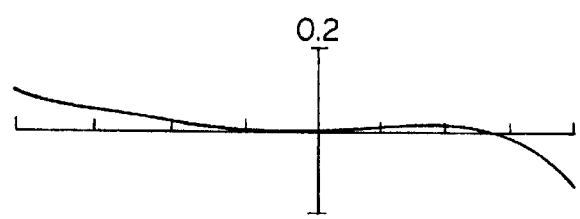
Figure 14G:
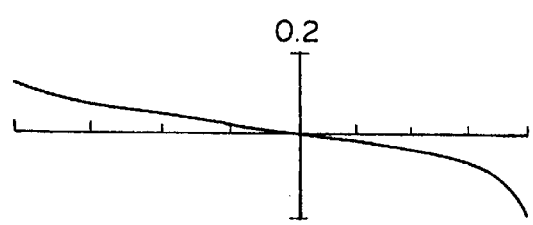
Figure 14H:
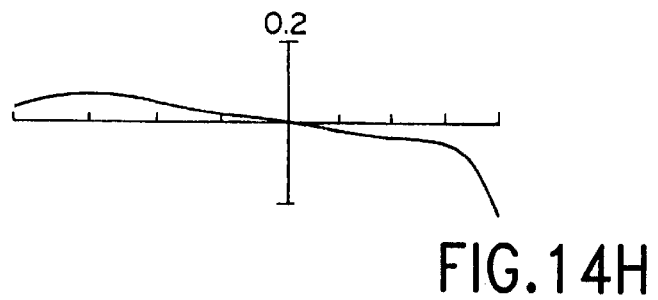

FIG. 4 is a cross-sectional view of a lens system showing the wide angle lens in accordance with the fourth embodiment of the present invention.

Namely, this lens system comprises, arranged in the following order from the screen side toward the liquid crystal side, a first lens group composed of a meniscus concave lens L1 having a weak power, a concave lens L2, whose concave surface having a large radius of curvature is directed toward a smaller conjugate side (liquid crystal panel), and a convex lens L3; a second lens group composed of one concave lens L6 and four convex lenses L4, L5, L7, and L8; and a third lens group composed of a Fresnel lens L9 which is disposed near a liquid crystal panel L10.

In this lens system, the lenses having main powers are made of glass lens, while powers of plastic lenses are made weak, such that the focal movement is minimized with respect to change in temperature.

The following Table 7 shows radius of curvature R (mm) of each lens surface near the optical axis X, central thickness of each lens or air space between neighboring lenses d (mm), refractive index N of each lens with respect to d-rays, and abbe number ν of each lens in this embodiment.

The numbers attached to the marks R, d, N, and ν in Table 7 are in numerical order from the screen side.

Here, the distance d6 between the first and second lens groups and the distance d15 between the second and third lens groups are variable. At a low magnification (×10), d6 and d15 are 6.85 mm and 109.99 mm, respectively. At a high magnification (×16), d6 and d15 are 7.42 mm and 106.75 mm, respectively.

The abbe number ν 1 of the lens L2 which is the concave lens in the first group is 50.9, whereas the abbe number ν 2 of the lens L6 which is the concave lens in the second lens group is 25.5, thereby satisfying the conditional expression of:

$$\nu 1 > \nu 2$$

Also, the focal length f1 of the first lens group is 97.42 mm, whereas the focal length f0 of the whole lens group system is 66.73 mm, thereby satisfying:

$$|f1| > f0$$

Further, both sides of the lenses L1 and L5 as well as the surface of the Fresnel lens L9 facing the liquid crystal panel are aspherical. Their forms are represented when values of C, K, a2, a4, a6, a8, and a10 shown in the following Table 8 are input into their corresponding coefficients in the above-mentioned aspherical expression.

In the lens data listed in Table 7, the last two-surface distance d18 is the sum of thickness values of the glass substrate and polarizing filter in the liquid crystal panel.

Aberration charts [showing spherical aberration (SPH), astigmatism (AST), image surface distortion (DIS), chromatic aberration (CHR), and coma (COMA)] for the foregoing first to fourth embodiments are shown in respective sets of FIGS. 7 and 8 (respectively at low and high magnifications), FIGS. 9 and 10 (respectively at low and high magnifications), FIGS. 11 and 12 (respectively at low and high magnifications), and FIGS. 13 and 14 (respectively at low and high magnifications).

As can be seen from these aberration charts, various aberrations can be kept at favorable levels in the wide angle lenses in accordance with the foregoing embodiments.

Without being restricted to the above-mentioned four embodiments, the wide angle lens of the present invention can be modified in various manners.

TABLE 1

| | R | d | $N_d$ | $\nu_d$ |
|---|---|---|---|---|
| *1 | 181.19 | 6.50 | 1.49018 | 57.8 |
| *2 | 43.702 | 63.36 | | |
| 3 | 127.16 | 6.70 | 1.84666 | 23.9 |
| 4 | −3310.8 | 31.37** | | |
| 5 | −58.885 | 5.02 | 1.80518 | 25.4 |
| 6 | 133.19 | 14.07 | 1.74300 | 49.2 |
| 7 | −70.768 | 0.21 | | |
| *8 | 388.0 | 15.12 | 1.49018 | 57.8 |
| *9 | −60.350 | 107.85** | | |
| 10 | ∞ | 2.0 | 1.49018 | 57.8 |
| *11 | −76.601 | 10.0 | | |
| 12 | ∞ | 3.0 | 1.51633 | 64.1 |
| 13 | ∞ | | | | d
4   32.47
9   105.06
$f_1 = 453.1$
$f_0 = 67.76$

TABLE 2

| | C | K | $a_2$ | $a_4$ | $a_6$ | $a_8$ | $a_{10}$ |
|---|---|---|---|---|---|---|---|
| 1 | $5.51907 \times 10^{-3}$ | 1.0 | 0.0 | $0.168008 \times 10^{-5}$ | $-0.45337 \times 10^{9}$ | $0.38916 \times 10^{-13}$ | $0.34661 \times 10^{-17}$ |
| 2 | $2.28822 \times 10^{-2}$ | 1.0 | 0.0 | $0.143764 \times 10^{-5}$ | $0.45771 \times 10^{-9}$ | $-0.33399 \times 10^{-12}$ | $-0.72080 \times 10^{-16}$ |
| 8 | $2.57732 \times 10^{-3}$ | 1.0 | 0.0 | $-0.75045 \times 10^{-6}$ | $0.78154 \times 10^{-10}$ | $0.92553 \times 10^{-14}$ | $0.96013 \times 10^{-18}$ |
| 9 | $-1.65700 \times 10^{-2}$ | 1.0 | 0.0 | $0.349218 \times 10^{-6}$ | $-0.65679 \times 10^{-10}$ | $0.62783 \times 10^{-13}$ | $0.17727 \times 10^{-16}$ |
| 11 | $-1.30547 \times 10^{-2}$ | −4.23480 | 0.0 | $-0.23533 \times 10^{-6}$ | $-0.20619 \times 10^{-10}$ | | |

TABLE 3

| | R | d | $N_d$ | $\nu_d$ |
|---|---|---|---|---|
| *1 | 426.28 | 6.8 | 1.49018 | 57.8 |
| *2 | 37.148 | 46.62 | | |
| *3 | 82.424 | 10.0 | 1.58361 | 30.3 |
| *4 | 560.42 | 39.41** | | |
| *5 | −92.911 | 5.0 | 1.49018 | 57.8 |
| *6 | −72.361 | 2.31 | | |
| 7 | 333.82 | 16.25 | 1.67003 | 47.3 |
| 8 | −51.453 | 0.2 | | |
| 9 | −74.227 | 4.0 | 1.84666 | 23.9 |
| 10 | 333.50 | 4.84* | | |
| 11 | −204.72 | 12.17 | 1.62041 | 60.3 |
| 12 | −59.623 | 107.3** | | |
| 13 | ∞ | 2.0 | 1.49018 | 57.8 |
| *14 | 72.522 | 10.0 | | |
| 15 | ∞ | 3.0 | 1.51633 | 64.1 |
| 16 | ∞ | | | | d
4   40.72
12   105.28
$f_1 = -389.92$
$f_0 = 66.87$

TABLE 4

| | C | K | $a_2$ | $a_4$ | $a_6$ | $a_8$ | $a_{10}$ |
|---|---|---|---|---|---|---|---|
| 1 | $2.34588 \times 10^{-3}$ | 1.0 | 0.0 | $0.10268 \times 10^{-5}$ | $-0.97357 \times 10^{-10}$ | $0.11114 \times 10^{-13}$ | $0.38507 \times 10^{-17}$ |
| 2 | $2.69193 \times 10^{-2}$ | 1.0 | 0.0 | $-0.33032 \times 10^{-6}$ | $-0.13809 \times 10^{-10}$ | $-0.52379 \times 10^{-13}$ | $-0.30522 \times 10^{-17}$ |
| 3 | $1.21324 \times 10^{-2}$ | 1.0 | 0.0 | $-0.20984 \times 10^{-5}$ | $-0.77541 \times 10^{-10}$ | $-0.45846 \times 10^{-13}$ | $0.12895 \times 10^{-16}$ |
| 4 | $1.78438 \times 10^{-3}$ | 1.0 | 0.0 | $-0.20827 \times 10^{-5}$ | $0.54503 \times 10^{-10}$ | $-0.23577 \times 10^{-12}$ | $-0.53937 \times 10^{-16}$ |
| 5 | $-1.07629 \times 10^{-2}$ | 1.0 | 0.0 | $0.11568 \times 10^{-7}$ | $-0.70208 \times 10^{-9}$ | $-0.30943 \times 10^{-13}$ | $-0.11018 \times 10^{-7}$ |
| 6 | $-1.38196 \times 10^{-2}$ | 1.0 | 0.0 | $0.29140 \times 10^{-5}$ | $0.68532 \times 10^{-9}$ | $-0.91526 \times 10^{-14}$ | $-0.54676 \times 10^{-8}$ |
| 14 | $-1.37889 \times 10^{-2}$ | $-5.38250$ | 0.0 | $-0.40057 \times 10^{-6}$ | | | |

TABLE 5

| | R | d | $N_d$ | $v_d$ |
|---|---|---|---|---|
| *1 | 914.26 | 8.5 | 1.49018 | 57.8 |
| *2 | 1225.54 | 9.68 | | |
| 3 | 15824.5 | 6.10 | 1.65844 | 50.9 |
| 4 | 44.083 | 35.07 | | |
| 5 | 74.730 | 14.73 | 1.62004 | 36.3 |
| 6 | −168.76 | 32.56** | | |
| *7 | −57.497 | 5.0 | 1.49018 | 57.8 |
| *8 | −56.828 | 0.40 | | |
| 9 | −73.435 | 5.02 | 1.80518 | 25.5 |
| 10 | 154.37 | 18.28 | 1.51633 | 64.1 |
| 11 | −56.244 | 0.3 | | |
| 12 | −381.68 | 16.98 | 1.62041 | 60.3 |
| 13 | −61.632 | 109.78** | | |
| 14 | ∞ | 2.0 | 1.49018 | 57.8 |
| *15 | −84.140 | 8.0 | | |
| 16 | ∞ | 3.0 | 1.51633 | 64.1 |
| 17 | ∞ | | | | d
6   34.02
13  107.92
$f_1 = 282.37$
$f_0 = 66.85$

TABLE 6

| | C | K | $a_2$ | $a_4$ | $a_6$ | $a_8$ | $a_{10}$ |
|---|---|---|---|---|---|---|---|
| 1 | $1.09378 \times 10^{-3}$ | 1.0 | 0.0 | $0.18658 \times 10^{-5}$ | $-0.13093 \times 10^{-9}$ | $0.23823 \times 10^{-13}$ | $0.50168 \times 10^{-17}$ |
| 2 | $8.15967 \times 10^{-4}$ | 1.0 | 0.0 | $0.17307 \times 10^{-5}$ | $-0.12268 \times 10^{-9}$ | $-0.22713 \times 10^{-13}$ | $-0.55619 \times 10^{-17}$ |
| 7 | $-1.73922 \times 10^{-2}$ | 1.0 | 0.0 | $-0.39016 \times 10^{-7}$ | $-0.10447 \times 10^{-9}$ | $0.44163 \times 10^{-13}$ | $0.26554 \times 10^{-17}$ |
| 8 | $-1.75969 \times 10^{-2}$ | 1.0 | 0.0 | $0.31159 \times 10^{-5}$ | $0.33139 \times 10^{-9}$ | $0.67965 \times 10^{-13}$ | $0.49343 \times 10^{-17}$ |
| 15 | $-1.18850 \times 10^{-2}$ | $-4.61147$ | 0.0 | $0.20853 \times 10^{-7}$ | $0.90546 \times 10^{-10}$ | $-0.37248 \times 10^{-13}$ | |

TABLE 7

| | R | d | $N_d$ | $v_d$ |
|---|---|---|---|---|
| *1 | −530.89 | 9.5 | 1.49018 | 57.8 |
| *2 | −477.18 | 7.32 | | |
| 3 | 361.45 | 5.6 | 1.65844 | 50.9 |
| 4 | 37.841 | 50.42 | | |
| 5 | 58.744 | 10.52 | 1.59551 | 39.2 |
| 6 | −138.71 | 6.85** | | |
| 7 | −100.69 | 3.52 | 1.51742 | 52.4 |
| 8 | −79.005 | 13.07 | | |
| *9 | −57.823 | 4.99 | 1.49018 | 57.8 |
| *10 | −56.200 | 1.5 | | |
| 11 | −70.555 | 5.03 | 1.80518 | 25.5 |
| 12 | 65.998 | 21.46 | 1.51742 | 52.4 |
| 13 | −65.998 | 0.3 | | |
| 14 | −312.32 | 12.79 | 1.62041 | 60.3 |
| 15 | −66.122 | 109.99** | | |
| 16 | ∞ | 2.0 | 1.49018 | 57.8 |

TABLE 7-continued

| | | | | |
|---|---|---|---|---|
| *17 | −74.140 | 8.8 | | |
| 18 | ∞ | 2.2 | 1.51633 | 64.1 |
| 19 | ∞ | | | | d
6    7.42
15   106.75
$f_1 = 97.42$
$f_0 = 66.73$

TABLE 8

| | C | K | $a_2$ | $a_4$ | $a_6$ | $a_8$ | $a_{10}$ |
|---|---|---|---|---|---|---|---|
| 1 | $-1.88363 \times 10^{-3}$ | 1.0 | 0.0 | $0.15599 \times 10^{-5}$ | $-0.17712 \times 10^{-9}$ | $0.18809 \times 10^{-13}$ | $0.25646 \times 10^{-17}$ |
| 2 | $-2.09565 \times 10^{-3}$ | 1.0 | 0.0 | $0.14650 \times 10^{-5}$ | $-0.19004 \times 10^{-9}$ | $0.11032 \times 10^{-13}$ | $0.11052 \times 10^{-17}$ |
| 9 | $-1.72942 \times 10^{-2}$ | 1.0 | 0.0 | $-0.27881 \times 10^{-7}$ | $-0.20727 \times 10^{-9}$ | $-0.56576 \times 10^{-13}$ | $-0.26915 \times 10^{-17}$ |
| 10 | $-1.77936 \times 10^{-2}$ | 1.0 | 0.0 | $0.31478 \times 10^{-5}$ | $0.43065 \times 10^{-9}$ | $0.88376 \times 10^{-13}$ | $0.70679 \times 10^{-17}$ |
| 17 | $-1.34880 \times 10^{-2}$ | $-4.62152$ | 0.0 | $0.127868 \times 10^{-6}$ | $0.35898 \times 10^{-12}$ | $-0.57762 \times 10^{-14}$ | $-0.32584 \times 10^{-17}$ |

What is claimed is:

1. A wide angle lens comprising, in the following order from a screen side:

a first lens group composed of a concave lens, whose concave surface has a radius of curvature directed toward a panel side, and a convex lens;

a second lens group composed of at least one concave lens and at least two convex lenses; and a third lens group composed of a Fresnel lens which is disposed near an object to be projected and has a positive power, each of said first and second lens groups having at least one lens with an aspherical surface, said wide angle lens satisfying a conditional expression:

$$\nu 1 > \nu 2$$

wherein an abbe number of the concave lens of said first lens group is $\nu 1$ and an abbe number of the concave lens of said second lens group is $\nu 2$.

2. A wide angle lens according to claim 1:

wherein conjugate length is changed so as to alter magnification of projection; and wherein the Fresnel lens of said third lens group is fixed, while the first and second lens groups are movable variable distance therebetween; and said wide angle lens satisfies a conditional expression:

$$|f1| > f0$$

wherein focal length of said first lens group is f1 and focal length of the whole lens system is f0.

* * * * *